Patented Dec. 18, 1928.

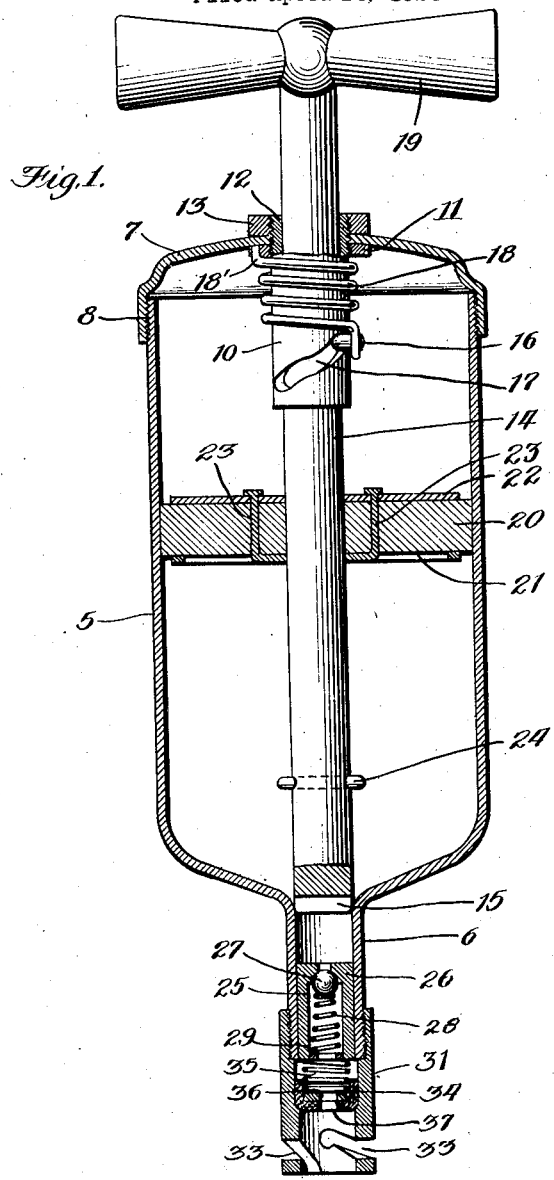

1,695,588

UNITED STATES PATENT OFFICE.

OTTO J. HERB, OF CHICAGO, ILLINOIS, ASSIGNOR TO ALEMITE MANUFACTURING CORPORATION, OF CHICAGO, ILLINOIS, A CORPORATION OF DELAWARE.

LUBRICANT COMPRESSOR.

Application filed April 14, 1924. Serial No. 706,336.

My invention relates to improvements in lubricant compressors and is particularly concerned with improvements in that type of lubricating compressors used in connection with a plurality of fittings which are secured to the bearings to be lubricated, the compressor being provided with means for successively forming sealed connections with the fittings so that lubricant under high pressure can be forced into the bearings.

The objects of my invention are:

First: To provide a compressor of the type described, by means of which a lubricant can be easily and quickly forced into the bearings under high pressure.

Second: To provide a compressor of the character described which can be easily and quickly connected with the fittings by a simple movement.

Third: To provide a compressor of the character described, by means of which the lubricant can be forced into the bearing by a succession of short, simple movements on the part of the operator, and Fourth: To provide a compressor of the character described which is simple in construction, economical to manufacture and rugged.

Other objects of the invention will appear as this description progresses, reference being had to the accompanying drawings, in which Figure 1 is a central, longitudinal section through one embodiment of my invention; and Figure 2 is a view, partially in section and partially in elevation, showing a bearing and one of the fittings with which the embodiment of my invention described herein is particularly adapted to co-act.

Referring to the drawings, my improved compressor comprises a barrel 5, one end of which is reduced in diameter to form the cylinder 6 and the other end of which is closed by the removable cover 7, which may be attached thereto by a screwthreaded connection 8, or any other desired manner.

A sleeve 10 extends through a central aperture in the cover 7. This sleeve has an annular collar 11, and the outer end of the sleeve is threaded, as shown at 12, so that a nut 13 may be used for clamping a portion of the cover 7 between the nut and the flange 11 and thus rigidly positioning the sleeve 10 relatively to the cover 7.

A plunger rod 14 is slidably mounted in the sleeve 10 and its inner end extends to a point adjacent the cylinder 6. The extreme inner end of the plunger 14 is provided with a transverse slot 15, to permit the passage of lubricant from the barrel 5 into the cylinder 6.

A pin 16, extending outwardly from the piston rod 14, rides in a spiral slot 17 formed in the sleeve 10 and is urged to the outer end of this slot by means of the spiral spring 18, one end of which engages the pin 16 and the other end 18′ of which is secured in an opening in the flange 11. The outer end of the rod 14 is provided with a suitable handle 19 by which it can be oscillated.

The piston, comprising the disk 20, of leather, felt, fibre or any other suitable material, and the face plate 21 and follower plate 22, is slidably mounted upon the plunger rod 14. Tongues 23, stamped from the face plate 21 and extending through the disk 20 and follower plate 22, provide means for securing the three elements of the piston together. To enable the piston to be withdrawn from the barrel for the purpose of filling the latter, I provide a transversely extending pin 24, which extends through and beyond the sides of the plunger 14, so that when the cover is removed and the plunger rod 14 is pulled outwardly, these pins will engage the piston and cause it to be removed from the barrel along with the plunger rod 14.

A thimble 25 is pressed into the outer end of the cylinder 6 and is provided at its inner end with a valve seat 26. The valve 27 is yieldingly held against the seat 26 by means of a spiral spring 28 which is confined between the valve 27 and lugs 29, pressed inwardly from the outer end of the thimble 25. For enabling the compressor construction just described to be connected with a fitting 30 of well known construction, I prefer to secure to the outer end of the cylinder 6 the sleeve 31 which is provided at its outer end with the inclined bayonet or cam slots 33. A cup leather 34 is slidably mounted in the sleeve 31 and yieldingly held in its outermost position by means of a compression spring 35, the inner end of which bears against the outer end of the thimble 25, and the outer end of which bears against a washer 36 in the bottom of the cup leather 34. It will, of course, be understood that the cup leather 34 is provided with a central aperture 37 registering with the opening in the washer 36, so as to permit the passage of lubricant through the cup leather into the fitting 30 in a well known manner.

In using my improved compressor described above, after it has been suitably filled with lubricant, the operator grasps the handle 19 and uses it to position the sleeve 31 so that the bayonet slots 33 are positioned to receive the pin 39 of the fitting 30. By turning upon the handle, the sleeve 31 can be forced over the fitting 30 so as to bring the outer end of the fitting into sealed contact with the cup leather 34. The spring 18 has sufficient tension to permit the operation just described to be accomplished without moving the pin 16 in the slot 17, but as soon as the connection between the fitting 30 and the sleeve 31 has been effected, further movement of the handle 19 in the same direction will cause the pin 16 to ride inwardly in the slot 17 and thereby force the inner end of the plunger 14 into the cylinder 6, and thus displace the contents of the cylinder 6 through the valve seat 26 and outwardly through the washer 36, the cup leather 34 and into the fitting 30. By continued oscillation of the handle 19 the operator can force any desired quantity of lubricant into a bearing.

When the plunger 14 is withdrawn from the cylinder 6, under either the tension of the spring 18 or manually, for it will be understood that the spring 18 may be omitted if desired, the valve 27 prevents the entry of air into the cylinder 6 and also prevents the backflow of any lubricant into the cylinder 6, so that a vacuum is created in the cylinder 6 between the end of the plunger rod and the inner end of the thimble 25, and when the plunger rod 14 reaches a position so that the slot 15 establishes communication between the barrel and the cylinder 6, atmospheric pressure exerted upon the outer face of the piston, heretofore described, will cause the latter to move toward the cylinder 6, thereby displacing lubricant from the barrel 5 and forcing it into the cylinder. In this manner, each time the plunger 14 is retracted the cylinder 6 is primed with lubricant and upon reverse movement of the plunger rod 14 this lubricant is discharged into the fitting.

While I have described the details of construction of the preferred embodiment of my invention, it is to be clearly understood that my invention is not limited to these details but is capable of other adaptations and modifications within the scope of the appended claims.

Having thus described my invention, what I claim is:

1. A lubricant compressor, comprising a barrel having a removable closure at one end and a cylinder at its other end, a sleeve extending through said cover and secured thereto, said sleeve having an inclined slot formed therein, a plunger extending through said sleeve and into said cylinder, the inner end of said plunger being slotted, a pin extending outwardly from said plunger and engaging the sides of said inclined slot, a spring engaging the end of said pin and tending to move said pin to one end of said inclined slot, an outwardly opening check valve at the outer end of said cylinder, and means for connecting said cylinder with a fitting.

2. A lubricant compressor, comprising a barrel having a removable closure at one end and a cylinder at its other end, a sleeve extending through said cover and secured thereto, said sleeve having an inclined slot formed therein, a plunger extending through said sleeve and into said cylinder, a pin extending outwardly from said plunger and engaging the sides of said slot, an outwardly opening check valve at the outer end of said cylinder, and means for connecting said cylinder with a fitting.

3. A lubricant compressor, comprising a barrel having a removable closure at one end and a cylinder at its other end, a sleeve secured to said closure, said sleeve having an inclined slot formed therein, a plunger extending through said sleeve and into said cylinder, a pin extending outwardly from said plunger and engaging the sides of said slot, an outwardly opening check valve at the outer end of said cylinder, and means for connecting said cylinder with a fitting.

4. A lubricant compressor, comprising a barrel having a removable closure at one end and a cylinder at its other end, a sleeve secured to said closure, said sleeve having an inclined slot formed therein, a plunger extending through said sleeve and into said cylinder, a pin extending outwardly from said plunger and engaging the sides of said slot, and means for connecting said cylinder with a fitting.

5. A lubricant compressor, comprising a barrel having a removable closure at one end and a cylinder at the other end, a cam surface carried by said closure, a plunger extending through said closure and into said cylinder, said plunger having means for co-acting with said cam surface for advancing said plunger into said cylinder when said plunger is rotated relatively to said barrel, a spring for urging said plunger out of said cylinder, a piston slidable on said plunger, and means for effecting a sealed connection between said cylinder and a fitting.

6. A lubricant compressor, comprising a barrel having a removable closure at one end and a cylinder at the other end, a cam surface carried by said closure, a plunger extending through said closure and into said cylinder, said plunger having means for co-acting with said cam surface for advancing said plunger into said cylinder when said plunger is rotated relatively to said barrel, and means for effecting a sealed connection between said cylinder and a fitting.

7. A compressor, comprising a barrel having a closure at one end and a cylinder at the other end, a plunger extending through said closure, co-acting means on said closure and plunger for moving the inner end of said plunger into said cylinder when said plunger is rotated relatively to said barrel, and a piston slidably mounted on said plunger.

8. A lubricant compressor, comprising a barrel having a closure at one end and a cylinder of smaller diameter at the other end, a plunger extending through said closure, co-acting means on said closure and plunger for moving the inner end of said plunger into said cylinder when said plunger is rotated relatively to said barrel, and rigid means for effecting a sealed connection between said cylinder and a fitting to be lubricated.

9. A lubricant compressor, comprising a barrel having a cylinder of smaller diameter at one end and a cam surface adjacent the other end, a plunger rod extending lengthwise of said barrel and projecting from said barrel, the projecting end of said plunger rod being provided with a handle, means carried by said plunger rod for co-acting with the cam surface on said barrel to reciprocate said plunger rod when said handle is oscillated, and rigid coupling means for effecting a sealed connection between said cylinder and a lubricant receiving fitting, said means having a part adapted to interlock with a co-operating part on the fitting by movement in the same direction as the movement which advances said plunger.

10. In a lubricating apparatus, the combination of a barrel for containing a supply of lubricant, having a closed end and a discharge end having a bore of reduced diameter, a compression plunger within the barrel and extending through said closed end, the inner end of said plunger being of a size to slidingly fit said bore, a handle on the outer end of said plunger, a helical cam member and a cam engaging member, one of said members being secured to the plunger and the other secured to said closed end, the members being so arranged that turning of the plunger in one direction will cause the plunger to enter said cylinder.

In witness whereof, I hereunto subscribe my name this 11th day of April, 1924.

OTTO J. HERB.